United States Patent
Ibrahim et al.

(10) Patent No.: US 11,977,782 B2
(45) Date of Patent: May 7, 2024

(54) APPROACH FOR ENABLING CONCURRENT EXECUTION OF HOST MEMORY COMMANDS AND NEAR-MEMORY PROCESSING COMMANDS

(71) Applicant: Advanced Micro Devices, Inc., Santa Clara, CA (US)

(72) Inventors: Mohamed Assem Abd ElMohsen Ibrahim, Santa Clara, CA (US); Meysam Taassori, Santa Clara, CA (US); Mahzabeen Islam, Austin, TX (US); Shaizeen Aga, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 14 days.

(21) Appl. No.: 17/855,442

(22) Filed: Jun. 30, 2022

(65) Prior Publication Data

US 2024/0004585 A1    Jan. 4, 2024

(51) Int. Cl.
*G06F 3/06* (2006.01)

(52) U.S. Cl.
CPC .......... *G06F 3/0659* (2013.01); *G06F 3/0613* (2013.01); *G06F 3/0673* (2013.01)

(58) Field of Classification Search
CPC .......... G06F 3/065; G06F 3/0659; G06F 3/06; G06F 3/0613; G06F 3/0673
See application file for complete search history.

(56) References Cited

U.S. PATENT DOCUMENTS 11,468,001 B1 * 10/2022 Hassaan .............. G06F 15/7821
2016/0283388 A1 * 9/2016 Blankenship ....... G06F 12/0808

(Continued)

FOREIGN PATENT DOCUMENTS

EP    4060505 A1 *    9/2022    ......... G06F 12/0238

OTHER PUBLICATIONS

B. Y. Cho, Y. Kwon, S. Lym and M. Erez, "Near Data Acceleration with Concurrent Host Access," 2020 ACM/IEEE 47th Annual International Symposium on Computer Architecture (ISCA), Valencia, Spain, 2020, pp. 818-831.*

Cho, Benjamin Y. • Kwon, Yongkee • Lym, Sangkug • Erez, Mattan, "Near Data Acceleration with Concurrent Host Access", arxiv.org, Aug. 17, 2019.*

B. Falsafi et al., "Near-Memory Data Services," in IEEE Micro, vol. 36, No. 1, pp. 6-13, Jan.-Feb. 2016.*

*Primary Examiner* — Pierre Michel Bataille
(74) *Attorney, Agent, or Firm* — Hickman Becker Bingham Ledesma LLP

(57) ABSTRACT

An approach allows concurrent execution of near-memory processing commands, referred to herein as "PIM commands," and host memory commands. A memory controller determines and issues a plurality of register-only PIM commands that do not reference memory with host memory commands to allow concurrent execution of the register-only PIM commands and the host memory commands. The approach allows concurrent execution of register-only PIM commands and host memory commands without interference, even when the register-only PIM commands and the host memory commands are interleaved, and even for the same memory module, which improves resource utilization and performance. Further improvement of resource utilization and performance is achieved by extending a register-only phase by reordering register-only PIM commands before non-register-only PIM commands, subject to dependency constraints, and using shadow row buffers to provide local working copies of data from memory to near-memory compute elements.

20 Claims, 5 Drawing Sheets

(56) References Cited

U.S. PATENT DOCUMENTS

| | | | |
|---|---|---|---|
| 2018/0284992 A1* | 10/2018 | Haller | G06F 3/0631 |
| 2018/0284994 A1* | 10/2018 | Haller | G06F 12/0292 |
| 2021/0224213 A1* | 7/2021 | Raj | G06F 12/0238 |
| 2021/0349837 A1* | 11/2021 | Huangfu | G06F 9/5016 |
| 2023/0195375 A1* | 6/2023 | Puthoor | G06F 3/0631 |
| | | | 711/154 |

* cited by examiner

100

```
A memory controller determines a plurality of register-only PIM
commands                                                    102
```
↓
```
The memory controller determines one or more host memory
commands                                                    104
```
↓
```
The memory controller issues the register-only PIM commands and
the host memory commands                                    106
```

```
┌─────────────────────────────────────────────────────────┐
│  A memory controller determines a register-only phase   │
│                                                     402 │
└─────────────────────────────────────────────────────────┘
                            │
                            ▼
┌─────────────────────────────────────────────────────────┐
│ The memory controller issues the commands in the        │
│ register-only phase                                 404 │
└─────────────────────────────────────────────────────────┘
                            │
                            ▼
┌─────────────────────────────────────────────────────────┐
│ The memory controller extends the register-only phase   │
│ by one or more of:                                      │
│   1. reordering register-only PIM commands ahead of a   │
│      non-register-only command, or                      │
│   2. using a shadow row buffer.                         │
│                                                     406 │
└─────────────────────────────────────────────────────────┘
```

APPROACH FOR ENABLING CONCURRENT EXECUTION OF HOST MEMORY COMMANDS AND NEAR-MEMORY PROCESSING COMMANDS

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. The vector compute elements and the local registers allow a memory module to perform some computations locally, such as arithmetic computations. This allows a memory controller to trigger local computations at multiple memory modules in parallel without requiring data movement across the memory module interface, which can greatly improve performance, particularly for data-intensive workloads. Examples of data-intensive workloads include machine learning, genomics, and graph analytics.

One of the technical challenges with PIM techniques is that the fine grained interleaving of PIM commands and host memory commands can adversely affect performance due to contention on host, interconnect, and memory resources.

One solution to address these issues is to use dedicated computing architecture components, e.g., one set of components for processing host memory commands and other set of components for processing PIM commands. For example, PIM command execution may be limited to a subset of memory modules, e.g., pseudo channels, while the remaining memory modules are used to process host memory commands. This solution can lead to resource underutilization, however, during times when either no PIM commands or no host memory commands are being processed. Also, PIM performance may suffer as PIM data will have to be stored on the PIM-assigned memory modules, which will lead to lower parallelism and more memory row operation overhead, since more memory rows will be needed to store data. Finally, this solution would require specialized software support, which increases the complexity of software, and may complicate memory management for frameworks.

Another solution is to process PIM commands and host memory commands in phases. For example, processing only PIM commands during a PIM command phase and then switching to processing only host memory commands during a host memory command phase. While this solution also addresses interference between PIM commands and host memory commands, it is coarse-grained and like the prior solution of using dedicated computing architecture components, can lead to resource underutilization. In view of the foregoing, there is therefore a need for an approach for processing PIM commands and host memory commands in a manner that does not suffer from the limitations of other solutions.

BRIEF DESCRIPTION OF THE DRAWINGS

Implementations are depicted by way of example, and not by way of limitation, in the figures of the accompanying drawings and in which like reference numerals refer to similar elements.

FIG. 4 is a flow diagram that depicts an approach for allowing concurrent execution of PIM commands and host memory commands.

DETAILED DESCRIPTION

Figures 1, 2A:
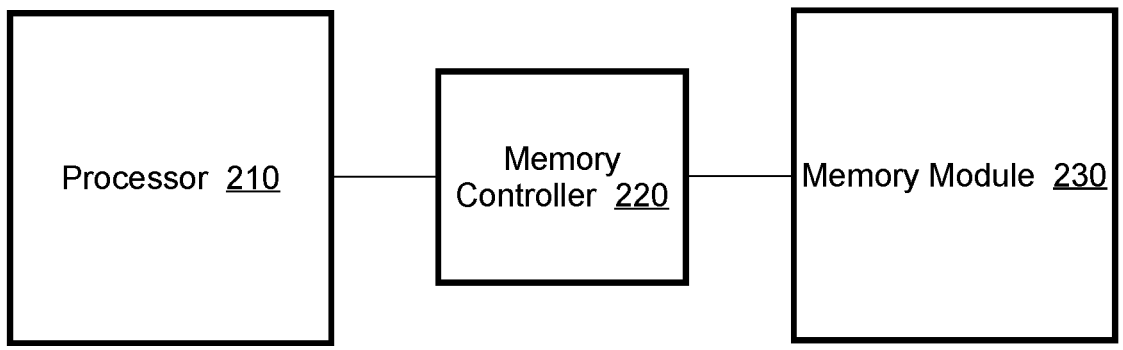
FIG. 1 is a flow diagram that depicts an approach for allowing concurrent execution of PIM commands and host memory commands.
FIG. 2A is a block diagram that depicts an example computing architecture upon which the approach for allowing concurrent execution of PIM commands and host memory commands is implemented.

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
    II. Architecture
    III. Concurrent Execution of PIM Commands and Host Memory Commands
        A. Register-Only Phases
        B. Extending Register-Only Phases by Reordering
        C. "Full Use" PIM Phases
        D. Extending Register-Only Phases Using a Shadow Row Buffer
            i. Overview
            ii. Multiple Rows
            iii. Managing Modified Data

I. Overview

An approach is provided for allowing concurrent execution of near-memory processing commands, referred to herein as "PIM commands," and host memory commands. As used herein, the term "near-memory" refers to a location within or near a memory module, such as at caches, memory controllers, etc., and the term "host memory command" refers to a command issued by a host that references memory, such as a load or store command. Implementations are described herein in the context of memory controllers for purposes of explanation, but implementations are not limited to memory controllers and are applicable to any type of memory command processing element, such as caches, queues, buffers, etc.

According to the approach, a memory controller determines a plurality of PIM commands that do not reference memory, e.g., PIM commands that do not load or store data to or from memory, and perform operations and/or computations on data in one or more registers that are local to the memory controller. These commands are referred to herein as "register-only PIM commands" for purposes of explanation. As used herein, the term "register" refers to any local storage used by a near-memory processing element and examples include, without limitation, registers, local caches, queues, buffers, etc.

The memory controller issues the plurality of register-only PIM commands with host memory commands to allow concurrent execution of the register-only PIM commands and the host memory commands. The approach allows concurrent execution of register-only PIM commands and host memory commands without interference, even when the register-only PIM commands and the host memory commands are interleaved, and even for the same memory module, which improves resource utilization and performance. Further improvement of resource utilization and performance is achieved by extending a register-only phase by reordering register-only PIM commands before non-register-only PIM commands, subject to dependency constraints, and using shadow row buffers to provide local working copies of data from memory to near-memory compute elements. The approach also provides software developers with the fine-grained capability to create code regions with interleaved PIM commands and host memory commands.

FIG. 1 is a flow diagram 100 that depicts an approach for allowing concurrent execution of PIM commands and host memory commands. In step 102, a memory controller determines a plurality of register-only PIM commands, i.e., PIM commands that do not reference memory. For example, processing logic in the memory controller determines a plurality of register-only PIM commands stored in one or more command queues, e.g., a single queue for all commands or separate queues for different types of commands.

In step 104, the memory controller determines one or more host memory commands. For example, the processing logic in the memory controller determines host memory commands, such as loads and stores, stored in the one or more command queues.

In step 106, the memory controller issues the register-only PIM commands, and the host memory commands.

II. Architecture

FIG. 2A is a block diagram that depicts an example computing architecture 200 upon which the approach for allowing concurrent execution of PIM commands and host memory commands is implemented. In this example, the computing architecture 200 includes a processor 210, a memory controller 220, and a memory module 230. The computing architecture 200 includes fewer, additional, and/or different elements depending upon a particular implementation. In addition, implementations are applicable to computing architectures 200 with any number of processors, memory controllers and memory modules.

The processor 210 is any type of processor, such as a Central Processing Unit (CPU), a Graphics Processing Unit (GPU), an Application-Specific Integrated Circuit (ASIC), a Field-Programmable Logic Array (FPGA), an accelerator, a Digital Signal Processor (DSP), etc. The memory module 230 is any type of memory module, such as a Dynamic Random Access Memory (DRAM) module, a Static Random Access Memory (SRAM) module, etc. According to an implementation, and as described in more detail hereinafter, the memory module 230 is a PIM-enabled memory module.

The memory controller 220 manages the flow of data between the processor 210 and the memory module 230 and is implemented as a stand-alone element or implemented in the processor 210, for example on a separate die from the processor 210, on the same die but separate from the processor, or integrated into the processor circuitry as an integrated memory controller. The memory controller 220 is depicted in the figures and described herein as a separate element for explanation purposes.

Figure 2B:
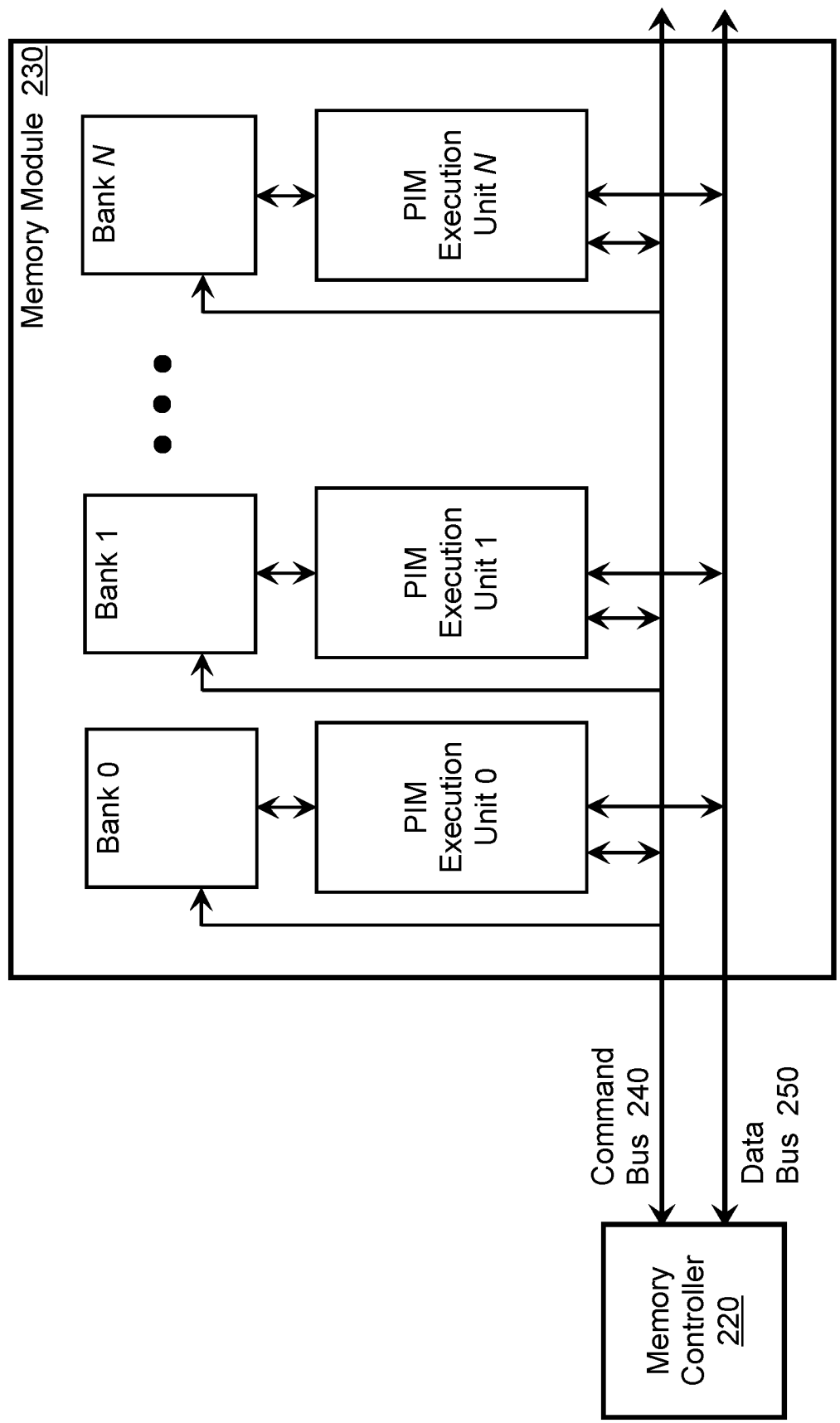
FIG. 2B depicts an example implementation of a memory module in the context of a PIM-enabled DRAM memory module communicatively coupled to a memory controller via a command bus and a data bus.

FIG. 2B depicts an example implementation of the memory module 230 in the context of a PIM-enabled DRAM memory module communicatively coupled to the memory controller 220 via a command bus 240 and a data bus 250. The PIM-enabled DRAM memory module includes N number of banks, where each bank includes a corresponding PIM execution unit. The PIM execution units include processing logic and local storage in the form of registers for performing local computations. The memory module 230 includes fewer or additional elements that vary depending upon a particular implementation.

Figure 2C:
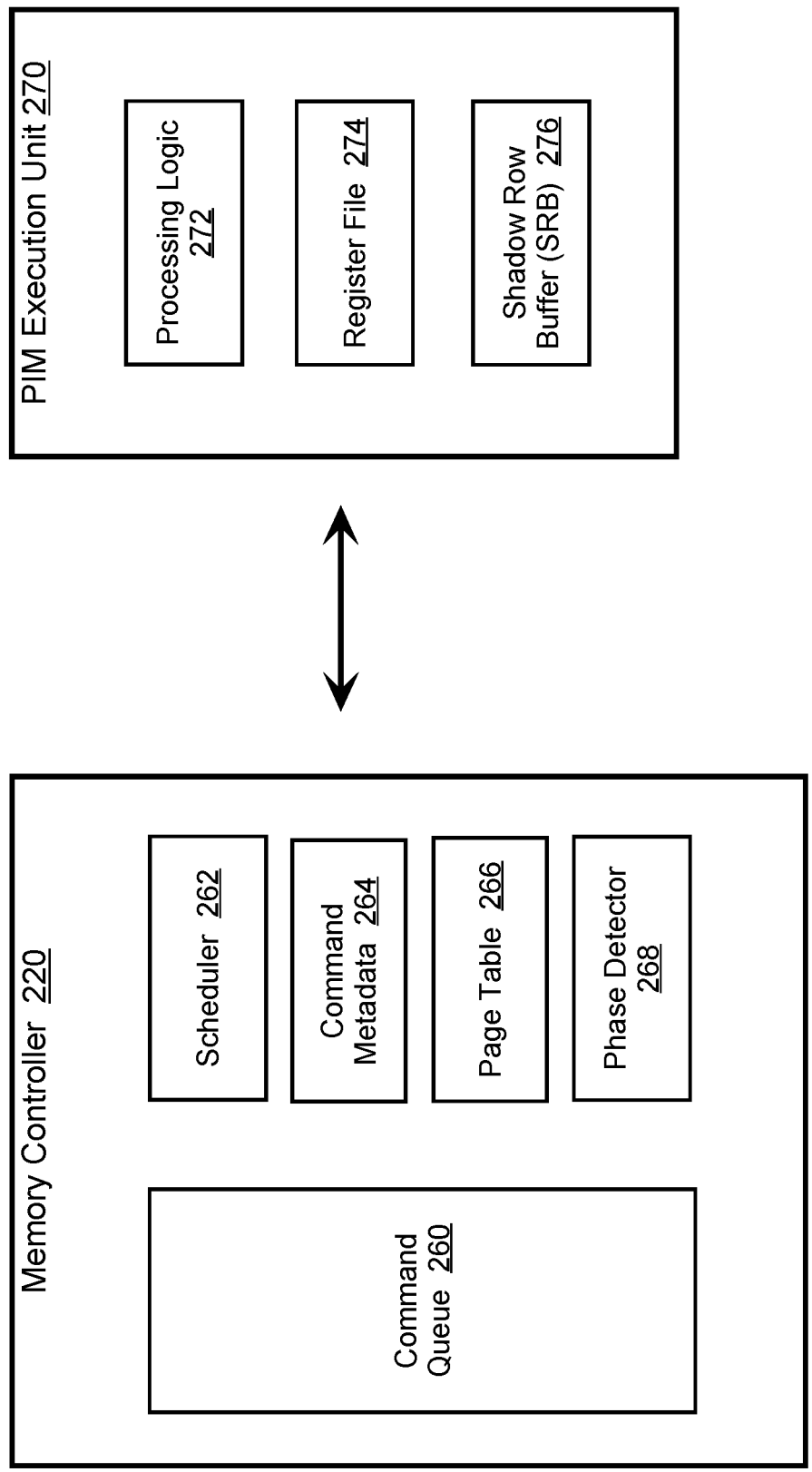
FIG. 2C depicts an example implementation of a memory controller and a PIM execution unit.

FIG. 2C depicts an example implementation of the memory controller 220 and a PIM execution unit 270. In this example, the memory controller 220 includes a command queue 260, a scheduler 262, command metadata 264, a page table 266, and a phase detector 268. The memory controller 220 includes fewer or additional elements that vary depending upon a particular implementation and that are not depicted in the figures and described herein for purposes of explanation. In addition, the functionality provided by the various elements of the memory controller 220 are combined in any manner, depending upon a particular implementation.

The command queue 260 stores memory commands, including PIM and non-PIM commands, received by the memory controller 220, for example from one or more threads executing on the processor 210. PIM commands are broadcast memory commands directed to multiple memory elements in a memory module, such as multiple banks in a DRAM memory module. The target memory elements are specified by one or more bit values, such as a bit mask, in the PIM commands, and specify any number, including all, of the available target memory elements. PIM commands cause some processing to be performed by multiple, including all, of the specified memory elements in the memory module 230, such as a logical operation and/or a computation. As one non-limiting example, a PIM command specifies that at each target bank, a value is read from memory at a specified row and column into a local register, an arithmetic operation performed on the value, and the result stored back to memory. Examples of non-PIM commands include, without limitation, load (read) commands, store (write) commands, etc. Unlike PIM commands that are broadcast memory processing commands and directed to multiple target banks, non-PIM commands are directed to a single bank, i.e., are bank specific.

The command queue 260 is implemented by any type of storage capable of storing memory commands, such as registers, a local cache, a buffer, etc. Although implementations are depicted in the figures and described herein in the context of the command queue 260 being implemented as a single element, implementations are not limited to this example and according to an implementation, the command queue 260 is implemented as multiple elements, for example, a separate command queue for different types of memory commands, e.g., PIM commands and non-PIM commands, each of the banks in the memory module 230, etc.

The scheduler 262 schedules memory commands for processing based upon various selection criteria, such as the order in which memory commands are enqueued in the command queue 260, timestamp information, etc. The command metadata 264 is optional and specifies one or more attributes of memory commands stored in the command queue 260, such as the type of command, e.g., PIM or non-PIM, a date and/or time when a memory command was stored in the command queue 260, a relative ordering of a memory command in the command queue 260, the type of command, command status, etc.

The page table 266 includes data that specifies the current state of one or more memory elements within a memory module and is used by the processing logic 272 to configure memory elements to process memory commands. For example, the page table 266 includes an entry for each bank of the memory module 230, where each entry specifies whether the corresponding bank currently has an open (activated) row from the most recent non-PIM command directed to that bank, if any, and if so, which row is currently open, e.g., via a row ID. When a row is opened or closed (deactivated) the processing logic 272 updates the corresponding entry in the page table 266.

The phase detector 268 manages memory commands stored in the command queue 260 to allow concurrent execution of PIM commands and host memory commands, as described in more detail hereinafter. The phase detector 268 is implemented by computer hardware elements, computer software, or any combination of computer hardware elements and computer software. Although implementations are depicted in the figures and described herein in the context of the phase detector 268 being a separate element in the memory controller 220, this is done for explanation purposes only and implementations include the functionality of the phase detector 268 being incorporated into other elements in the memory controller 220, such as the scheduler 262. In addition, although implementations are depicted in the figures and described herein in the context of the phase detector 268 being implemented in the memory controller 220, this is done for explanation purposes only and implementations include the phase detector 268 in other elements in the memory pipeline, such as caches, queues, buffers, etc. Furthermore, implementations include the phase detector 268 functionality implemented at multiple points along the memory pipeline to mitigate any performance degradation attributable to the processing performed by any particular phase detector 268, i.e., by becoming a "bottleneck."

The PIM execution unit 270 is an example implementation of the PIM Execution Units 0 through N of FIG. 2B. In the example depicted in FIG. 2C, the PIM execution unit 270 includes processing logic 272, a register file 274 and a Shadow Row Buffer (SRB) 276. The PIM execution unit 270 incudes additional or fewer elements that vary depending upon a particular implementation.

In the example of FIG. 2C, the processing logic 272 processes PIM commands including performing loads (reads) and stores (writes) to memory and computations, such as arithmetic computations and logic operations. The register file 274 is any type of local storage, such as a group of registers used by the processing logic 272 to perform local computations, to store results, etc. The SRB 276 is local storage that stores a local copy of data from memory. For example, in the context of DRAM, the SRB 276 stores data from one or more portions of one or more DRAM rows. As described in more detail hereinafter, use of the SRB 276 provides further improvement of resource utilization and performance by allowing non-register-only PIM commands to operate on a local copy of data from memory concurrent with the processing of non-PIM memory commands on the same memory locations. The SRB 276 is implemented by any type of local storage, for example, by one or more registers, caches, queues, buffers, etc.

III. Concurrent Execution of PIM Commands and Host Memory Commands

A. Register-Only Phases

According to an implementation, the phase detector 268 is configured to evaluate commands received by the memory controller 220 to detect register-only phases. As used herein, the term "register-only phase" refers to a group of register-only PIM commands without any intervening non-register-only PIM commands. The group of register-only PIM commands may include any number of host memory commands, interleaved or non-interleaved. Implementations are depicted in the figures and described herein in the context of the phase detector 268 evaluating commands stored in the command queue 260 to detect register-only phases, i.e., after commands are enqueued in the command queue 260, but this is done for explanation purposes only and implementations include the phase detector 268 evaluating received commands before they are enqueued in the command queue 260.

Figure 3D:
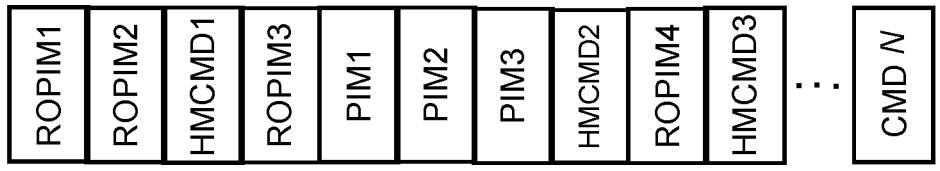
FIG. 3D is a block diagram that depicts a set of commands in a command queue.
Figure 3C:
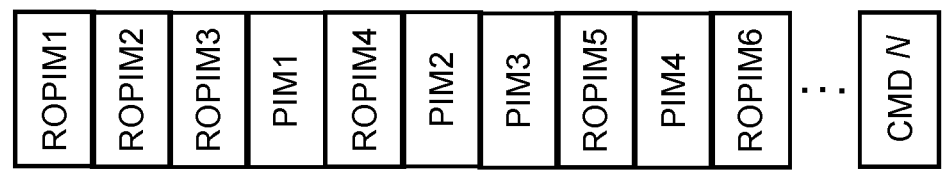
FIG. 3C is a block diagram that depicts a set of commands in a command queue that represents a full-use PIM phase.
Figure 3B:
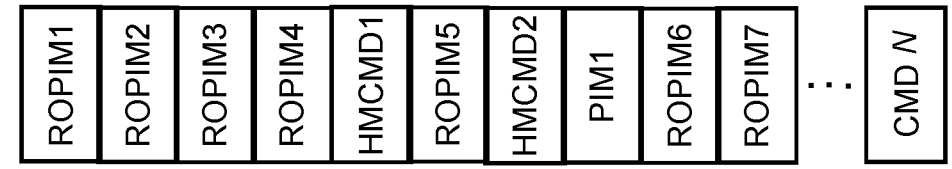
FIG. 3B is a block diagram that depicts another set of commands in a command queue.
Figure 3A:
FIG. 3A is a block diagram that depicts a set of commands in a command queue.

FIG. 3A is a block diagram that depicts a set of commands 310 in the command queue 260, where "ROPIM" refers to a Register-Only PIM command, i.e., a PIM command that does not reference memory, "HMCMD" refers to a host memory command that does reference memory, such as a load or store command, and "CMD/V" refers to an Nth command in the command queue 260.

In the example of FIG. 3A, there are seven ROPIM commands identified as "ROPIM1" through "ROPIM7" and three HMCMD commands identified as "HMCMD1" through "HMCMD3." As depicted in FIG. 3A, the three HMCMD commands are interleaved in the seven ROPIM commands. Implementations are applicable to ROPIM commands of various forms, for example, ROPIM commands that specify a single operation or computation, and compound commands that specify multiple operations or computations. In the case of compound commands that specify multiple operations or computations, the multiple operations or computations may be specified in the compound commands, or defined by data stored locally on the memory controller 220. For example, the memory controller 220 stores data that maps particular compound PIM commands to multiple operations and/or computations. Using compound PIM commands reduces command bus congestion and improves performance. Various techniques for implementing compound commands are described in U.S. Patent Publication Number US2021/0326063, the entire contents of which are incorporated herein by reference for all purposes. Other implementations include using command coalescing, as described in U.S. Patent Publication Number 2021/0389907, the entire contents of which are incorporated herein by reference for all purposes, command compression, and utilizing underutilized/idle data bus bandwidth.

According to an implementation, a register-only phase has at least a specified number of register-only PIM commands in the command queue 260 without any intervening non-register-only PIM commands. For example, if the specified number is three, then the phase detector 268 detects a register-only phase since the set of commands 310 includes at least three register-only PIM commands in the command queue 260, without any intervening non-register-only PIM commands. In the example of FIG. 3A, the set of commands 310 includes seven register-only PIM commands without any intervening non-register-only PIM commands. The phase detector 268 therefore causes the entire set of commands 310 through ROPIM7 to be issued, for example in cooperation with the scheduler 262 and in the order in which the commands were enqueued into the command queue 260, which allows the register-only PIM commands (ROPIM1-ROPIM7) to be processed concurrently with the host memory commands (HMCMD1-HMCMD3) without interference, since the register-only PIM commands (ROPIM1-ROPIM7) do not reference memory, even when the register-only PIM commands and the host memory commands are directed to the same memory element, e.g., the same DRAM module. A register-only phase may include any number of host memory commands. The phase detector 268 may evaluate the commands in the command queue 260 to detect a register-only phase at specified times and/or periodically. The time at which the phase detector 268 evaluates the commands in the command queue to detect a register-only phase and the specified number of register-only PIM commands may be programmed into or be part of the configuration of the memory controller 220, or may be configured via software, e.g., by a configuration command or as a semantic to an existing PIM command. Implementations include other techniques for identifying longer PIM phases, as described in U.S. Patent Publication Number US2021/0326063.

B. Extending Register-Only Phases by Reordering

Techniques are provided herein for extending register-only phases. According to an implementation, register-only phases are extended by reordering commands in the command queue 260. In this implementation, the phase detector 268 is configured to increase the size or length of a register-only phase by issuing register-only PIM commands ahead of non-register-only PIM commands. For example, suppose that a register-only phase is followed by a non-register-only PIM command, i.e., a PIM command that references memory, and then subsequent register-only PIM commands. The phase detector 268 causes the subsequent register-only PIM commands to be issued prior to the non-register-only PIM command, subject to maintaining memory consistency. This may be accomplished by the phase detector 268 reordering commands in the command queue 260. Alternatively, the phase detector 268 tracks and/or deletes commands from the command queue 260 that have been issued.

FIG. 3B is a block diagram that depicts a set of commands 320 in the command queue 260. The set of commands 320 is similar to the set of commands 310, except a non-register-only PIM command (PIM1) is in the command queue 260 in place of the host memory command HMCMD3. In this example, the non-register-only PIM command (PIM1) references memory, for example loads data from memory and/or stores data to memory. In this implementation, the phase detector 268 issues the register-only PIM commands ROPIM6 and ROPIM7 after the host memory command HMCMD2 and before the non-register-only PIM command PIM1, as indicated by the reference numeral 312.

According to an implementation, changing the order of issuance in this manner is conditioned upon no data dependencies via registers or memory, which can take various forms. For example, reordering register-only PIM commands before a non-register-only PIM command is dependent upon the register-only PIM commands not being dependent upon data stored in registers or memory by the non-register-only PIM command. In the present example, the phase detector 268 only issues the register-only PIM commands ROPIM6 and ROPIM7 before the non-register-only PIM command PIM1 if the register-only PIM commands ROPIM6 and ROPIM7 are not dependent upon the non-register-only PIM command PIM1, i.e., are not dependent upon data in registers or memory from the non-register-only PIM command PIM1. An example dependency is that the non-register-only PIM command PIM1 causes data to be stored in a register or memory that is used by one or both of the register-only PIM commands ROPIM6 and ROPIM7. For example, suppose that the non-register-only PIM command PIM1 causes data to be stored in register Reg0 and the register-only PIM command ROPIM6 adds the contents of register Reg0 to the contents of register Reg1 and stores the results in register Reg2 in the register file 274. Since the non-register-only PIM command PIM1 updates the data in register Reg0 and the register-only PIM command ROPIM6 uses the updated data in register Reg0, there is a dependency and the phase detector 268 does not issue the register-only PIM command ROPIM6 prior to the non-register-only PIM command PIM1. In this situation, the non-register-only PIM command PIM1 and the register-only PIM commands ROPIM6 and ROPIM7 are issued in their enqueued order. A similar situation exists if the non-register-only PIM command PIM1 updates data in a memory location that is used by the register-only PIM command ROPIM6.

As another example, reordering register-only PIM commands before a non-register-only PIM command is dependent upon the non-register-only PIM command not being dependent upon data stored in registers or memory by the register-only PIM commands. In the present example, the phase detector 268 determines whether the register-only PIM commands ROPIM6 and ROPIM7 update data in registers or memory used by the non-register-only PIM command PIM1. If so, then the register-only PIM commands ROPIM6 and ROPIM7 are not reordered before the non-register-only PIM command PIM1.

Although in the example of FIG. 3B, the set of commands 320 does not include any host memory commands after the non-register-only PIM command PIM1, host commands after a non-register-only PIM command may also be issued before the non-register-only PIM command, also subject to no dependencies. Extending the register-only phase as described herein further improves utilization and performance by increasing the number of PIM commands and host memory commands that are processed concurrently.

According to an implementation, a register-only phase continues until the number of register-only PIM commands without any intervening non-register-only PIM commands falls below the specified number. This may include the reordering described above. So, for example, suppose that in the set of commands 320 of FIG. 3B the register-only PIM command ROPIM6 cannot be issued before the non-register-only PIM command PIM1 because of a dependency, e.g., the non-register-only PIM command PIM1 updates data that is used by the register-only PIM command ROPIM6. In this situation the register-only phase ends because the non-register-only PIM command PIM1 may interfere with a subsequent host memory command. Alternatively, the phase detector 268 is notified of the end of a register-only phase by a special command or a semantic to an existing command from a host thread. The phase detector 268 resumes detecting the next register-only phase.

After completion of a register-only phase, the memory controller 220 continues to issue commands from the command queue 260. According to an implementation, when a non-register-only PIM command is issued, such as PIM1, the memory controller 220, for example the scheduler 262 and/or the phase detector 268, determines whether the non-register-only PIM command will potentially interfere with any upcoming host memory commands in the command queue 260. Potential interference exists, for example, when the non-register-only PIM command references the same memory address as an upcoming host memory command. If potential interference exists, the memory controller 220 tracks the non-register-only PIM command for completion and then issues the host memory commands. If no potential interference exists, the memory controller 220 proceeds to issue the host memory commands. Alternatively, instead of determining whether potential interference exists and tracking the non-register-only PIM command for completion, the memory controller 220 waits a specified amount of time to ensure that the non-register-only PIM command has completed and then issues the host memory commands. The specified amount of time is determined and/or selected based upon empirical information that ensures the non-register-only PIM command has completed execution to avoid interference with subsequent host memory commands. According to an implementation, the interference check is not performed when the non-register-only PIM command and the host memory commands are guaranteed to be mutually exclusive as managed from the software level.

C. "Full Use" PIM Phases

According to an implementation, the phase detector 268 detects "full-use" PIM phases. A "full-use" PIM phase is characterized by a sequence of commands that does not include any host memory commands and may represent, for example, a time when a host thread is performing compute work that does not require access to memory. The commands include register-only PIM commands, non-register-only PIM commands, or a mix of register-only PIM commands and non-register-only PIM commands. FIG. 3C is a block diagram that depicts a set of commands 330 in the command queue 260 that represents a full-use PIM phase. The set of commands 330 includes register-only PIM commands (ROPIM1-ROPIM6) and non-register-only PIM commands (PIM1-PIM4).

A full-use PIM phase is detected in different ways depending upon a particular implementation. For example, the phase detector 268 identifies a full-use PIM phase by a special PIM command issued by a host that is designated for initiating a full-use PIM phase or a new semantic on an existing PIM command. According to an implementation, the phase detector 268 detects a full-use PIM based upon the contents of the command queue 260. For example, the phase detector 268 determines whether the next N number of commands in the command queue 260 include any host memory commands and if not, then a full-use PIM phase has been detected. The parameter N is programmed into the memory controller 220 or specified via a special command or a new semantic for an existing command. During a full-use PIM phase, PIM commands, including non-register-only PIM commands, are issued, for example in the order in which they were enqueued into the command queue 260. Also, the issuing (reordering) of register-only PIM commands ahead of non-register-only PIM commands is not performed during full-use PIM phases because there is no risk of non-register-only PIM commands interfering with host memory commands, since no host memory commands are issued during the full-use PIM phase.

D. Extending Register-Only Phases Using a Shadow Row Buffer i. Overview

According to another implementation, register-only phases are extended using a shadow row buffer. A shadow row buffer is local storage that is used by near-processing memory elements to perform operations and computations. More specifically, a shadow row buffer stores a local copy of data from memory that is used by near-memory compute elements to process non-register-only PIM commands. This allows near-memory compute elements to process non-register-only PIM commands using the local copy of data stored in the shadow row buffer, while host memory commands are concurrently processed, e.g., loading data from memory or storing data to memory, without interference. This improves utilization and performance.

Implementations are described herein in the context of DRAM for purposes of explanation, but implementations are not limited to DRAM and are applicable to any type of memory. Also, using a shadow row buffer to extend a register-only phase may be used separate from or in conjunction with the reordering approach previously described herein. According to an implementation, shadow row buffers are power gated when not in use to reduce power consumption.

According to this implementation, the phase detector 268 determines whether at least N number of non-register-only PIM commands in the command queue 260 reference the same row in memory, for example, by examining the row ID in the commands. The value of N is selected such that the benefits of extending a register-only phase using a shadow row buffer outweighs the overhead attributable to using the approach, and the value of N is configured in the memory controller 220 or specified by a special PIM command or as a new semantic to an existing PIM command.

In response to determining that at least N number of non-register-only PIM commands in the command queue 260 reference the same row in memory, the phase detector 268 causes the data referenced by the N number of non-register-only PIM commands to be loaded into the Shadow Row Buffer (SRB) 276. For example, the phase detector 268 causes a separate command to be issued to load the row data into the SRB 276, or modifies the first non-register-only PIM command that references the row such that when the non-register-only PIM command is processed by the PIM execution unit 270, the row data is loaded into the SRB 276. The data loaded into the SRB 276 is the data at the particular column addresses specified by the N number of non-register-only PIM commands or all of the data in the row, i.e., the entire row, specified by the N number of non-register-only PIM commands. Thus, separate commands may be issued to retrieve the data at each of the column addresses or a single command issued to retrieve the entire row of data, i.e., for all of the column addresses. The phase detector 268 also modifies the non-register-only PIM commands that reference the row to instead reference the copy of the data stored in the SRB 276. This process is referred to herein as a Local Buffer (LB) phase, and is used to further extend register-only phases.

FIG. 3D is a block diagram that depicts a set of commands 340 in the command queue 260. The set of commands 340 includes four register-only PIM commands (ROPIM1-ROPIM4), three host memory commands (HMCMD1-HMCMD3), and three non-register-only PIM commands (PIM1-PIM3). In this example, the three non-register-only PIM commands PIM1-PIM3 all reference data that is stored in the same DRAM row, and it is presumed that the value of N is three or less. For example, the first non-register-only PIM command PIM1 references row X, column 1, the second non-register-only PIM command PIM2 references row X, column 4, and the third non-register-only PIM command PIM3 references row X, column 7, etc. Before issuing the first non-register-only PIM command PIM1, the phase detector 268 either issues a separate PIM command or modifies the first non-register-only PIM command PIM1 to cause the row data to be stored in the SRB 276. Continuing with the prior example, this causes the data from row X, columns 1, 4, and 7 to be stored in the SRB 276. Alternatively, all of the data from row X is stored in the SRB 276.

The phase detector 268 also modifies the three non-register-only PIM commands PIM1-PIM3 to reference the SRB 276 instead of memory. For example, suppose that the first non-register-only PIM command PIM1 adds the value at a memory location L1 to the value in register Reg0 and stores the result in register Reg2, e.g., pim-add (L1, Reg0, Reg2), where L1 specifies a column in the currently-open row. The phase detector 268 modifies the command to reference the corresponding column in the SRB 276, e.g., pim-add (SRB(L1), Reg0, Reg2), where "SRB" designates that the location in the SRB 276 instead of memory. When processed, this causes the value at the column location L1 in the SRB 276 to be added to the value in register Reg0 and the result stored in register Reg2. Data is not required to be stored in the same column in the SRB 276 as the column in memory, and implementations including storing data in different columns of the SRB 276 and maintaining mapping data that maps columns in memory to columns in the SRB 276, as described in more detail hereinafter.

The SRB 276 can also be used as a destination for results. For example, suppose that the first non-register-only PIM command PIM1 multiplies the value in register Reg0 by the value in register Reg1 and stores the result in memory location L1, e.g., pim-mul (Reg0, Reg1, L1). The phase detector 268 modifies the command to reference a column in the SRB 276, e.g., pim-mul (Reg0, Reg1, SRB(L1)). When processed, this causes the result of the multiplication to be stored in the corresponding column L1 in the SRB 276, which may be the same column in memory, or a different column determined via the mapping data. Techniques for managing modified copies of data in the SRB 276 is described in more detail hereinafter.

After issuing the third non-register-only PIM command PIM3, the phase detector 268 continues to issue host memory commands and does not have to wait for completion of the non-register-only PIM commands. For example, the phase detector 268 causes, e.g., in cooperation with the scheduler 262, the host memory command HMCMD2 to be issued and processed concurrently with the non-register-only PIM commands PIM1-PIM3 without interference. Implementations are also applicable to host memory commands interleaved between the non-register-only PIM commands. For example, in FIG. 3D host memory commands may be interleaved between non-register-only PIM commands PIM1-PIM3 and these host commands can be issued by the memory controller 220 in order without waiting for the non-register-only PIM command PIM3 to be issued. The example command formats and notations are used herein for explanation purposes and implementations can use any formats and notations. Any number of additional LB phases can be detected and processed in the same manner to further extend register-only phases, further improving resource utilization and performance.

ii. Multiple Rows

According to an implementation, LB phases are extended to data in multiple rows of memory. For example, referring again to FIG. 3D, suppose that the first and second non-register-only PIM commands PIM1 and PIM2 reference row X, columns 1 and 2, respectively, of memory, and the third non-register-only PIM command PIM3 references row Y, column 3, of memory. The phase detector 268 causes the data referenced by the three non-register-only PIM commands to be stored in the SRB 276, even though the data is stored in separate rows of memory. Thus, instead of loading data from only row X into the SRB 276, the phase detector 268 loads at least the data from row X, columns 1 and 2, and the data from row Y, column 3, into the SRB 276. The data can be stored at columns 1-3 of the SRB 276 so that the column addresses referenced by the non-near-register PIM commands can be retained. According to an implementation, the phase detector 268 tracks and manages the mapping of data from memory to the SRB 276 to enable the data to be stored contiguously in the SRB 276. It is presumed that the memory controller 220 manages activation of different rows in the memory module 230 to ensure proper execution of near-memory processing commands.

In some situations, the non-register-only PIM commands may reference different rows but the same column in memory. According to an implementation, in this situation, the data from memory is shifted to different portions, e.g., a different column(s), in the SRB 276 and tracked by the phase detector 268. For example, suppose that the first and second non-register-only PIM commands PIM1 and PIM2 reference row X, columns 1 and 2, respectively, of memory, and the third non-register-only PIM command PIM3 references row Y, column 2, of memory. Note that in this example, two of the register-only PIM commands have the same column address, i.e., column 2. To address this situation, the phase detector 268 causes the data referenced by the three non-register-only PIM commands to be stored in the SRB 276 in locations 1-3 and the phase detector 268 changes, i.e., shifts, the column address in the third non-register-only PIM command from 2 to 3. In an implementation, the phase detector 268 tracks or maps that the data in location 3 of the SRB 276 corresponds to row Y, column 2, in case the data is modified and needs to be written to memory, as described in more detail hereinafter. The particular columns in this example are for explanation purposes only and implementations are applicable to non-contiguous column addresses, e.g., the first and second non-register-only PIM commands reference columns 1 and 2, while the third non-register-only PIM command references column 7.

According to an implementation, the SRB 276 is configured to store multiple complete rows of data and in the present example, the phase detector 268 causes data in rows X and Y of memory to be stored in the SRB 276. For example, the data in row X of memory is stored in the first row of the SRB 276 and the data in row Y of memory is stored in the second row of the SRB 276. In this implementation, the non-register-only PIM commands reference the corresponding row and column in the SRB 276. Continuing with the prior example, the first and second non-register-only PIM commands PIM1 and PIM2 reference the first row of the SRB 276 and the third non-register-only PIM command PIM3 references the second row of the SRB 276.

iii. Managing Modified Data

As previously described herein, implementations are applicable to non-register-only PIM commands storing results of computations in the SRB 276, which may cause modifications to the data stored in the SRB 276. For example, a non-register-only PIM command may store a value in the SRB 276 that overwrites an existing value with a different value. In this situation, the SRB 276 stores a data value that is a modified version of the corresponding data store in memory.

According to an implementation, the memory controller 220 is configured to use the SRB 276 in a read-only mode or a read-write mode. The mode is specified, for example, by configuring the components of the memory controller 220, such as the phase detector 268, to operate in a particular mode during fabrication, by configuration data used by the phase detector 268, or by a new command or a new semantic to an existing command to specify the read-only mode or the read-write mode.

When operating in the read-only mode, data in the SRB 276 is used by near-memory processing elements to perform operations and computations, but data stored in the SRB 276 cannot be modified. For example, suppose that data from row X in memory is loaded into the SRB 276. The processing logic 272 in the PIM execution unit 270 uses the data in the SRB 276 to perform computations and the results of those computations are stored, for example, in the register file 274, but data in the SRB 276 is not overwritten with the results. The read-only mode does not prevent data in the SRB 276 from being overwritten with data from memory, i.e., to load more data from memory for another non-register-only PIM command.

In the read-write mode, data in the SRB 276 is used by processing elements to perform operations and computations, and the data stored in the SRB 276 can be modified. In the example non-register-only PIM command described above pim-mul (Reg0, Reg1, L1) the result of the multiplication computation (Reg0×Reg 1) is stored in memory location L1, which was modified by the phase detector 268 to reference the corresponding column in the SRB 276, i.e., pim-mul (Reg0, Reg1, SRB(L1)). When processed, this causes the result of the multiplication to be stored in the corresponding column L1 in the SRB 276, which may be the same column in memory or a different column determined via the mapping data, overwriting the current value. According to an implementation, the corresponding DRAM row is designated as non accessible and tracked by the memory controller 220 to ensure consistency as long as the modified version of the data in the SRB 276 is valid. The memory controller 220 then issues a special command, or an existing command with a new semantic, to cause the modified copy of data in the SRB 276 to be stored to memory so that the most recent version is now stored in the memory. For example, for any non-register-only PIM command that stores results in the SRB 276, the phase detector 268 and/or the scheduler 262 issues one or more commands, or adds a semantic to the next command in the command queue 260 to cause the modified data in the SRB 276 to be stored to memory. According to an implementation, updates to data from the SRB 276 are not stored back to the SRB 276 and instead are written to memory. For example, the phase detector 268 and/or the scheduler 262 issues one or more commands, or adds a semantic to the next command in the command queue 260 to cause the modified data in the SRB 276 to be stored to memory.

FIG. 4 is a flow diagram 400 that depicts an approach for allowing concurrent execution of PIM commands and host memory commands. In step 402, a memory controller determines a register-only phase. For example, the memory controller 220 identifies a group of at least a specified number of register-only PIM commands without any non-register-only PIM commands. The group of register-only PIM commands includes any number of host memory commands, which may be interleaved between the register-only PIM commands.

In step 404, the memory controller issues the commands in the register-only phase, including the specified number of register-only PIM commands and any number of host memory commands, to allow them to be processed concurrently.

In step 406, the memory controller extends the register-only phase using any number of the techniques described herein, alone or in any combination. These include extending a register-only phase by reordering register-only PIM commands ahead of a non-register-only PIM command and using a shadow row buffer, with the variations described herein.

The invention claimed is:

1. A memory command processing element configured to:
   determine a plurality of near-memory processing commands that do not reference memory, and
   cause issuance of the plurality of near-memory processing commands that do not reference memory and one or more host memory commands that do reference memory to allow the plurality of near-memory processing commands that do not reference memory and the one or more host memory commands that do reference memory to be processed concurrently.

2. The memory command processing element of claim 1, wherein the one or more host memory commands that do reference memory are interleaved with the plurality of near-memory processing commands that do not reference memory.

3. The memory command processing element of claim 1, wherein the plurality of near-memory processing commands that do not reference memory includes at least a specified number of near-memory processing commands that do not reference memory without any near-memory processing commands that reference memory.

4. The memory command processing element of claim 1, wherein:
   the plurality of near-memory processing commands that do not reference memory includes one or more near-memory processing commands that were enqueued after a near-memory processing command that references memory, and
   there are no data dependencies via registers or memory between the near-memory processing command that references memory and the one or more near-memory processing commands that were enqueued after the near-memory processing command that references memory.

5. The memory command processing element of claim 1, further configured to:
   determine a second plurality of commands that includes one or more near-memory processing commands that do not reference memory, one or more near-memory processing commands that reference memory, and no host memory commands, and
   cause the second plurality of commands to be issued.

6. The memory command processing element of claim 5, wherein the second plurality of commands is identified by one or more of a first near-memory processing command in the second plurality of commands or a separate command received by the memory command processing element.

7. The memory command processing element of claim 1, further configured to:
    determine a second plurality of near-memory processing commands that reference a particular row in a memory, and
    cause a copy of data stored in the particular row in the memory to be stored in a local buffer of a near-memory processing element and modify the second plurality of near-memory processing commands to reference the local buffer of the near-memory processing element instead of the particular row in the memory.

8. The memory command processing element of claim 7, wherein the copy of data stored in the particular row in the memory that is stored in the local buffer of the near-memory processing element is data stored at column addresses specified by the second plurality of near-memory processing commands or all of data in the particular row in the memory.

9. The memory command processing element of claim 7, further configured to prevent the copy of data stored in the local buffer of the near-memory processing element from being updated.

10. The memory command processing element of claim 7, further configured to cause a modified copy of the copy of data from stored in the local buffer of the near-memory processing element to be:
    stored in the local buffer of the near-memory processing element and the data stored in the particular row in the memory designated as non-accessible, or
    stored in the particular row in the memory.

11. The memory command processing element of claim 1, further configured to:
    determine two or more near-memory processing commands that reference different rows in a memory, and
    cause a copy of data stored at the different rows in the memory to be stored in a local buffer of a near-memory processing element and modify the two or more near-memory processing commands to reference the local buffer of the near-memory processing element instead of the memory.

12. The memory command processing element of claim 11, wherein the copy of data stored at the different rows in the memory is stored in a single row in the local buffer of the near-memory processing element or multiple rows in the local buffer of the near-memory processing element.

13. The memory command processing element of claim 1, wherein the memory command processing element is one or more of a memory controller, a cache, a queue, or a buffer.

14. A near-memory processing element comprising local storage;
    wherein the near-memory processing element is configured to:
    store, in the local storage, data from a plurality of memory locations referenced by a plurality of near-memory processing commands, and
    process the plurality of near-memory processing commands using the data from the plurality of memory locations stored in the local storage to allow one or more host memory commands that reference one or more memory locations from the plurality of memory locations to be processed concurrently.

15. The near-memory processing element of claim 14, wherein the plurality of memory locations referenced by the plurality of near-memory processing commands are in a single row of a memory.

16. The near-memory processing element of claim 15, further configured to cause a modified version of the data stored in the local storage to be stored to the memory.

17. A memory controller configured to:
    determine a plurality of near-memory processing commands that do not reference memory, and
    issue the plurality of near-memory processing commands that do not reference memory and one or more host memory commands that do reference memory to allow the plurality of near-memory processing commands that do not reference memory and the one or more host memory commands that do reference memory to be processed concurrently.

18. The memory controller of claim 17, wherein the one or more host memory commands that do reference memory are interleaved with the plurality of near-memory processing commands that do not reference memory.

19. The memory controller of claim 17, wherein the plurality of near-memory processing commands that do not reference memory includes at least a specified number of near-memory processing commands that do not reference memory without any near-memory processing commands that reference memory.

20. The memory controller of claim 17, wherein:
    the plurality of near-memory processing commands that do not reference memory includes one or more near-memory processing commands that were enqueued after a near-memory processing command that references memory, and
    there are no data dependencies via registers or memory between the near-memory processing command that references memory and the one or more near-memory processing commands that were enqueued after the near-memory processing command that references memory.

* * * * *